No. 607,362. Patented July 12, 1898.
F. W. H. GRAEFF.
EFFERVESCENT MILK BEVERAGE AND METHOD OF MAKING SAME.
(Application filed Dec. 1, 1897.)
(No Model.)
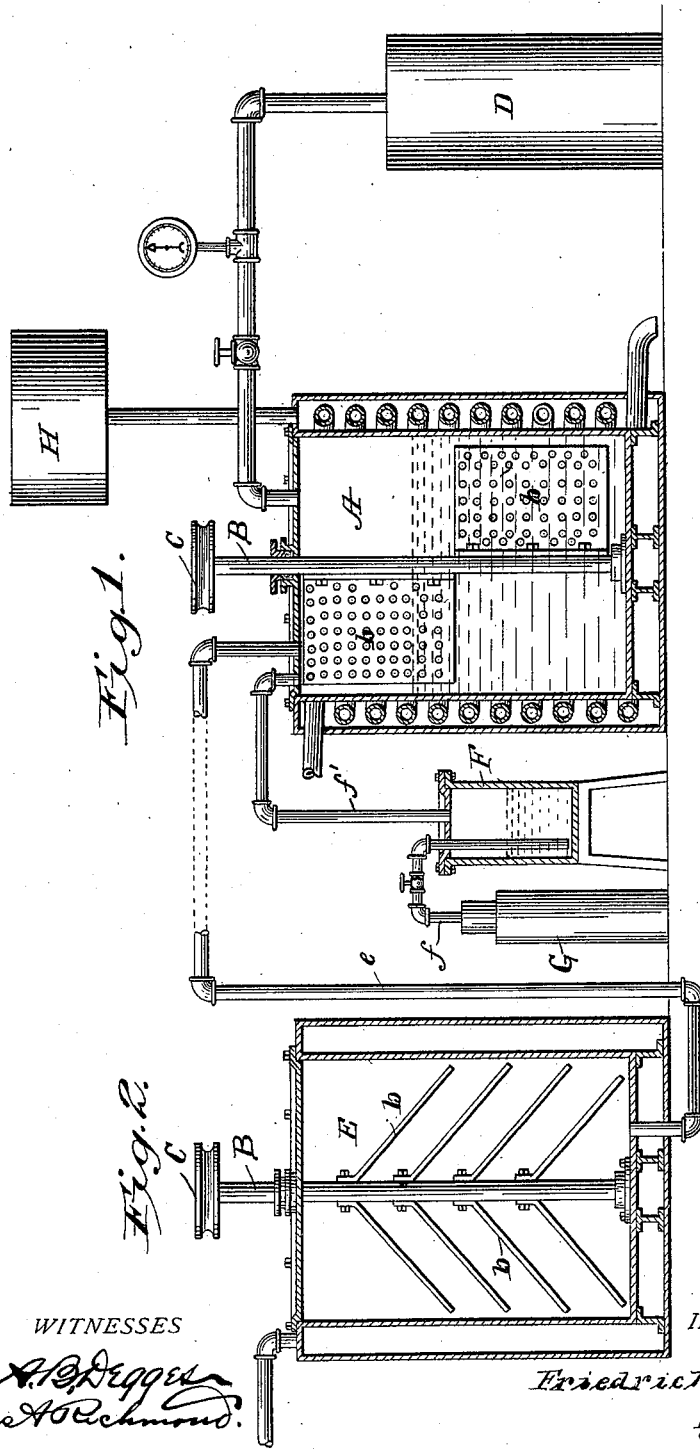
WITNESSES
INVENTOR
Friedrich W. H. Graeff.
by G. Dittmar.
Attorney

UNITED STATES PATENT OFFICE.

FRIEDRICH WILHELM HERMANN GRAEFF, OF BERLIN, GERMANY, ASSIGNOR TO MAURICE S. WORMSER, OF NEW YORK.

EFFERVESCENT MILK BEVERAGE AND METHOD OF MAKING SAME.

SPECIFICATION forming part of Letters Patent No. 607,362, dated July 12, 1898.

Application filed December 1, 1897. Serial No. 660,405. (No specimens.) Patented in France August 23, 1897, No. 257,695, and in England September 17, 1897, No. 21,387.

*To all whom it may concern:*

Be it known that I, FRIEDRICH WILHELM HERMANN GRAEFF, a subject of the King of Prussia, Emperor of Germany, residing at Berlin, in the German Empire, have invented certain new and useful Improvements in Effervescent, Sparkling, Durable, and Easily-Digested Beverages from Dairy Products and in Processes for the Manufacture of the Same, (for which I have obtained a patent in France, No. 257,695, dated August 23, 1897, and in England, No. 21,387, dated September 17, 1897;) and I do hereby declare the following to be a full, clear, and exact description of the invention, such as will enable others skilled in the art to which it appertains to make and use the same, reference being had to the accompanying drawings, forming part thereof.

In the accompanying drawings one apparatus is shown as an example, and reference will be had to the same hereinafter.

In said drawings, Figure 1 is a vertical section through the apparatus, and Fig. 2 shows a modification.

A closed vessel A, Fig. 1, is provided with a vertical shaft B', having blades $b$ secured thereon in a position one elevated above the other, said blades being provided with a series of small perforations. A closed vessel E, Fig. 2, is provided with a similar vertical shaft B and arms $b$, secured diagonally to said shaft, for use as stirrers, receiving motion from a belt-pulley or otherwise. For heating purposes said vessel E is surrounded by a steam-jacket. A pipe or tube $e$ branches off from the bottom of vessel E, leading to the top of vessel A, said tube being provided with a stop-cock. (Not shown.) When the vacuum is set on in the apparatus or the air-pump D is set in motion, the vacuum produced in the vessel A will cause the liquid contained in the vessel E to flow over into said vessel A, provided the cock in the pipe E is left open. Then the shaft B' is set in motion, and this motion is kept up continuously. The vessel A is provided with a steam-coil, so that the contents can be readily heated. The same coil may be used for cooling the heated milk.

A pipe $f$ connects the carbonic cylinder G with a vessel F and descends down to the bottom thereof through the liquid contents of formaline, and a pipe $f'$ leads from vessel F into vessel A. The application of formaline in this manner is preferred. Vessel A is exhausted by being connected with an exhauster D.

Heretofore in impregnating milk and the like with carbonic acid the air has not been fully removed, and for this reason the preservation was imperfect. The best preservation ensues when the milk, whey, or buttermilk is agitated and heated and the vessel put in connection with a vacuum arrangement and exhausted as far as possible while simultaneously heating and stirring. The impregnation of the previously air-exhausted milk now follows in a well-known manner until the desired degree of saturation has been attained. The milk is impregnated with carbonic acid, which is passed through a solution of formaline.

In previous trials for making effervescent sparkling milk the general principles adhered to were to remove the air above the milk in the charging-receptacle by introducing carbonic acid above the milk at a pressure of about one atmosphere and then turning on a higher pressure as the next step of impregnating or charging the milk with carbonic acid, say, at a pressure of two to three atmospheres. Although these experiments were undertaken a decennary ago, if not more, none of such processes have been satisfactory in making in every respect a sparkling and durable effervescent beverage from milk, &c., and in many instances the products obtained by these processes had entirely lost the character of a liquid and had, in fact, more the consistency of whipped cream.

The principal difficulties which manufacturers had to deal with or which they did not take into consideration, and hence did not obviate, can be seen in the fact that the air above the milk in the charging-receptacle was not completely exhausted, and, what is of much greater importance, that the milk itself contained a considerable quantity of air. The researches or Dr. Thörner, of Osnabrück, published in 1894 in *Die Chemise Zeitung*, p. 1845, prove that this is indeed the case. Dr. Thörner declares in said publication that milk direct from the cow contains fifty-seven to eighty-five cubic centimeters of gas bubbles per liter, of which air forms about one-third. Sterilized milk—that is, milk so boiled as to be durable—contains nineteen to twenty-seven cubic centimeters of gas, of which likewise one-third is atmospheric air. This air contained in the milk and which has heretofore been allowed to remain must, if a durable salable article is to be produced, be removed before the milk can be suitably charged with carbonic acid and its adjuncts, and the recognition of this fact and the method of removing the air from the milk forms the object of the present invention.

The milk to be converted into an effervescent beverage, including such products as buttermilk, whey, &c., pure or with flavors, and either in a fresh condition or pasteurized or sterilized, is placed in an apparatus provided with a suitable stirring device, so as to admit of an agitation of the fluid. Such dairy product is first heated to about 70° to 75° centigrade. The stirring device is set in motion and kept at work. A higher temperature can be used; but this is not advisable, as there is danger of the milk acquiring the taste of boiled milk. The vessel being connected to a vacuum apparatus and exhausted as far as possible, the stirring and heating operations progress continuously and simultaneously. By this method—i. e., continuous exhaust with simultaneous stirring and heating—it is possible to eliminate both the air over the milk and the air suspended in the milk, thereby preparing said milk to take up a charge of a gaseous preservative, and in this way a product results which has none of the disagreeable properties so apparent in the effervescent milk of previous experiments and which is at the same time durable and easily digested.

The charging of the milk from which the air has been exhausted, as above described, now follows in the well-known manner under pressure of sixteen pounds or more, if desired, until the desired degree of saturation has been attained. The impregnated milk under the pressure of carbonic acid may then be drawn off in bottles, jugs, siphons, &c., or larger vessels, which should be previously freed from air or filled with carbonic acid, or the charging of the milk, prepared as above described, can be accomplished in the last-named vessels. The same procedure is likewise essential for cream and buttermilk as for full or skimmed milk. The whey is used either in the condition in which it is obtained, sweet or sour, or it is heated to a temperature above 70° centigrade to allow the albumen to coagulate. The latter is then filtered off and the remaining liquid is impregnated, according to the aforememtioned treatment, with carbonic acid and formaldehyde. An acidity may be given by the utilization of ferment cultures. The milk so charged with carbonic acid which has been previously passed through a solution of formaldehyde sufficiently weak to neither influence the taste nor diminish its digestibility has none of the former disagreeable properties and is a refreshing, palatable, nourishing, and durable beverage.

Having thus described my invention, what I claim as new, and desire to secure by Letters Patent of the United States, is—

1. The herein-described process of manufacturing an effervescent sparkling durable beverage from dairy products, which consists in submitting the same under heat in a closed vessel to motion by stirring, and at the same time to a vacuum in order to completely evacuate the air contained therein, then cooling and finally impregnating with carbonic acid, which is admitted to the closed vessel under pressure, while the products are in motion, said carbonic acid having been previously charged with suitable proportions of formic aldehyde by passing the same through a solution of formic aldehyde, substantially as described.

2. The herein-described process of manufacturing an effervescent sparkling durable beverage from whey, which consists in separating the albumen from the whey, then submitting the whey in a closed vessel to motion by stirring, and at the same time to heat and to a vacuum, in order to completely evacuate the air contained therein, then cooling and finally impregnating with carbonic acid, which is admitted to the closed vessel under pressure, while the products are continually in motion, said carbonic acid having been previously charged with suitable proportions of formic aldehyde by passing the same through a solution of formic aldehyde, substantially as described.

3. The herein-described process of manufacturing an effervescent sparkling durable beverage from whey, which consists in separating the albumen from the whey, then adding to the whey, flavors influencing the taste, then submitting the same in a closed vessel to motion by stirring, and at the same time to a vacuum in order to completely evacuate the air contained therein, then cooling and finally impregnating with carbonic acid, which is admitted to the closed vessel under pressure, while the products are continually in motion, said carbonic acid having been previously charged with suitable proportions of formic aldehyde by passsing the same through a solution of formic aldehyde, substantially as described.

4. The herein-described effervescent, sparkling, durable and digestible beverage, which consists of a pasteurized or sterilized dairy product such as described, which has been freed from atmospheric air, and then charged with carbonic acid and formaldehyde, substantially as set forth.

5. The herein-described effervescent, sparkling, durable and digestible beverage from whey, which consists in whey deprived of its albumen, freed from air and charged with carbonic acid and formaldehyde under pressure as set forth.

6. The herein-described effervescent, sparkling, durable and digestible beverage from dairy products, which consists of milk or a fluid product thereof in a sterilized condition, freed from atmospheric air and charged with a mixture consisting of carbonic acid and formaldehyde, as set forth.

7. The herein-described effervescent, sparkling, durable and digestible beverage from whey, which consists of whey which has been simultaneously heated, agitated and submitted to a vacuum to deprive it of air and gases, and which is free from albumen and charged with carbonic acid and formaldehyde under pressure, as set forth.

In testimony whereof I affix my signature in presence of two witnesses.

FRIEDRICH WILHELM HERMANN GRAEFF.

Witnesses:
CHRISTIAN LIETZ,
HENRY HASPER.